United States Patent [19]

Brightwell

[11] Patent Number: 4,805,479
[45] Date of Patent: Feb. 21, 1989

[54] CABLE CLIP

[75] Inventor: David L. Brightwell, Billericay, England

[73] Assignee: Ford Motor Company, Dearborn, Mich.

[21] Appl. No.: 94,628

[22] Filed: Sep. 9, 1987

[30] Foreign Application Priority Data

Sep. 12, 1986 [GB] United Kingdom ............... 8622027

[51] Int. Cl.⁴ .................................................. F16C 1/14
[52] U.S. Cl. ................................... 74/502.4; 248/74.2; 74/502.6; 74/501.5 R; 74/500.5
[58] Field of Search .................. 248/65, 73, 74.1, 229, 248/231.8, 316.1, 316.7, 500, 505; 24/122.3, 555, 531, 339; 74/501 D, 501 F, 501.5 R, 500.5; 174/74 R

[56] References Cited

U.S. PATENT DOCUMENTS

| | | | |
|---|---|---|---|
| 1,927,615 | 9/1933 | Ponti | 74/501 D |
| 3,380,318 | 4/1968 | Henning | 74/501 D |
| 3,393,578 | 7/1968 | Tschanz | 74/501 D |
| 3,572,160 | 3/1971 | Stahr | 74/501 D |
| 3,587,341 | 6/1971 | Fiddler | 74/501 D |
| 3,645,150 | 2/1972 | Crossland | 74/501 D |
| 3,662,617 | 5/1972 | Bennett | 74/501 D |
| 3,710,645 | 1/1973 | Bennett | 74/501 D |
| 4,366,725 | 1/1983 | Kondo | 74/501 D |

FOREIGN PATENT DOCUMENTS

| | | | |
|---|---|---|---|
| 21733 | 10/1955 | Fed. Rep. of Germany | 248/73 |
| 947536 | 12/1961 | United Kingdom | |
| 2081411 | 2/1982 | United Kingdom | |

Primary Examiner—J. Franklin Foss
Assistant Examiner—Robert A. Olson
Attorney, Agent, or Firm—Jerome R. Drouillard; Roger L. May

[57] ABSTRACT

A snap-on clip for retaining the outer sheath of a Bowden cable includes a first channel-shaped member having resilient limbs and ribs on its inner surface, and a second member in the form of a sleeve, to fit over the outer sheath of the cable and having ribs on its outer surface. The sleeve is retained in said channel by said resilient limbs and by the interlocking engagement of said ribs, which prevent relative axial movement between said sleeve and said channel-shaped member.

5 Claims, 1 Drawing Sheet

CABLE CLIP

BACKGROUND OF THE INVENTION

The present invention relates to a clip for anchoring the outer sheath of a Bowden cable.

DESCRIPTION OF RELATED ART

The heater controls mounted on the instrument panel of a motor vehicle are usually connected to the heater doors and temperature regulating valve by means of Bowden cables and as with all such cables it is necessary to anchor the end of the outer sheath in a fixed position. It is usual to provide a degree of adjustment to enable play to be taken up while allowing a full range of movement. One problem experienced in the case of cables used for the heater controls of a vehicle is that the rear area of the dashboard is not readily accessible. As a result, it is difficult to use any form of tool within the confined space available to carry out required adjustments. It has for example been proposed to provide a grip which is screwed over the end of the cable to inhibit its movement but tightening the screw cannot be carried out effectively within the available space. An example of such a clip is discussed in British Patent No. 947,536, which is assigned to the Assignee of the present number.

The present invention seeks to provide a clip which can enable the outer sheath of a Bowden cable to be held securely in its desired position without the use of any tool.

According to the present invention, there is provided a snap-on clip for retaining the outer sheath of a Bowden cable, comprising a channel-shaped member having resilient limbs and ribs on its inner surface, and a sleeve, to fit over the outer sheath of the cable, having ribs on its outer surface, the sleeve being retainable in the channel by the resilient limbs and the interengagement of the ribs preventing relative axial movement between the sleeve and the channel-shaped member.

The clip of the invention offers a degree of adjustment in that prior to snapping the ribbed sleeve into the channel, the outer sheath may be moved axially to take up any slack or free play. The usual way of assembling such cables is to hold the regulating valve or the heater door, as the case may be, in a position corresponding to an indicated setting on the dashboard control and to anchor the cable after having taken up free play while the dashboard control is held in the appropriate position. With the snap-on clip of the invention, the anchoring of the outer sheath can be carried out without any tools and it is not even necessary to be able to see the end of the cable. After the inner cable has been suitably connected to the control, the outer sheath is pulled to take up slack and snapped between the limbs of the channel member.

It is preferred that the limbs include a return portion, or barb, in order to inhibit removal of the sleeve from the channel after assembly.

The ribbed sleeve may be formed as part of the outer sheath of the cable or be molded about the outer sheath. Alternatively, the sleeve may be separately formed and secured to the outer sheath by an adhesive or other suitable bond.

The channel-shaped member may be formed as part of the heater box or the instrument panel control. Alternatively the channel shaped member may be formed separately and secured to the anchoring surface, such as the heater box. For example the channel may form part of a stud designed to be snapped into a hole in the heater box.

DESCRIPTION OF THE PREFERRED EMBODIMENT

Figure 1:
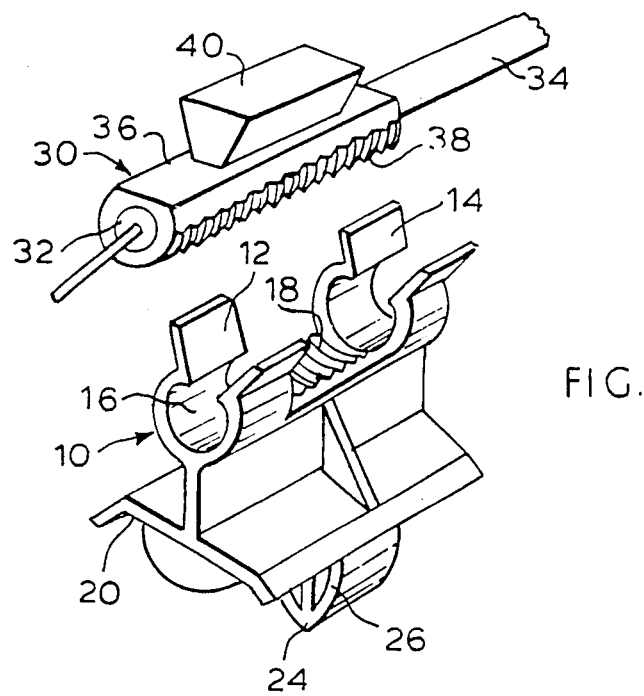
FIG. 1 is a perspective view of a clip according to the present invention with the components of the clip separated.

The clip in the drawings comprises a first member 10 which defines a channel 16 having two sets of resilient limbs 12 and 14. The base of the channel 16 has regular ribs 18.

Member 10 may be formed integrally with the element relative to which the outer sheath of the Bowden cable is to be anchored but in the case of the illustrated embodiment, the channel-shaped member 10 forms part of a stud which is self-locking on insertion into a hole.

Figure 2:
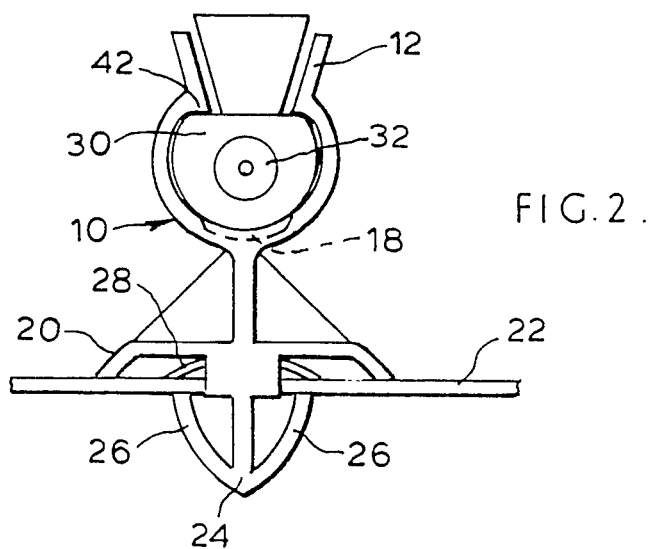
FIG. 2 shows an end view of a clip according to the present invention in an assembled state.

As is clearer from FIG. 2, member 10 has a base 20 which is relatively rigid and which rests against the surface of panel 22 into which it is inserted. A hook 24 with resilient prongs 26 depends from the underside of the base 20 and is designed to pass through a hole in panel 22. After passing through the hole, the prongs 26 spread out and engage the rear surfce of the panel 22 to prevent withdrawal of member 10. Flexible membrane 28, formed integrally with member 10, surrounds the hole in panel 22 to effect a seal.

Sleeve 30 is molded onto the end of the outer sheath 32 of cable 34, which has a flat upper surface 36 and ribs 38 on its underside, as viewed. A gripping portion 40 projects from the upper surface 36 which, when assembled into the member 10 lies between the upper ends of the resilient limbs 12 and 14. The ribs 38 are complementary with the ribs 18 on the inner surface of the member 10 and when assembled the two sets of ribs interlock and prevent axial movement of the sleeve 30 in the member 10.

Resilient limbs 12 and 14 are formed with barbs 42 which engage upper surface 36 of sleeve 30. Resilient limbs 12 and 14 are spread apart when sleeve 30 is forced in between them and after location of sleeve 30 within channel 16 barbs 42 engage flat surface 36 and prevent removal of sleeve 30 without separation of resilient limbs 12 and 14.

It can be seen that sleeve 30 can be forced into channel 16 in a variety of different axial positions and in any of these positions it is firmly held against axial displacement after it has been inserted by the interlocking engagement between the two sets of ribs 18 and 38.

The invention thus provides a clip which can be snapped into position and which requires no special tools for its assembly. The clip therefore lends itself particularly well to applications where access is restricted but it will be clear that there are other applications where the ease of assembly will be found desirable even when access is less severely restricted.

The foregoing description presents the presently preferred embodiment of this invention. Alterations and modifications may occur to those skilled in the art which will come within the scope of the appended claims.

I claim:

1. A snap-on retaining clip and Bowden cable assembly, comprising a U-shaped channel member having resilient limbs and ribs on its inner surface, and a sleeve, to fit over the outer sheath of the cable, having ribs on its outer surface, said sleeve being retainable in said channel by the resilient limbs with the interengagement of the ribs preventing relative axial movement between the sleeve and the channel member.

2. A clip as claimed in claim 1, wherein the limbs include a return portion in order to inhibit removal of the sleeve from the channel after assembly.

3. A clip as claimed in claim 1 wherein the ribbed sleeve is formed as part of the outer sheath of the cable.

4. A clip as claimed in claim 1, wherein the sleeve is separately formed and secured to the outer sheath by an adhesive bond.

5. A clip as claimed in claim 1, wherein the channel-shaped member is formed as part of a dashboard control panel.

* * * * *